(12) United States Patent
Stoffel et al.

(10) Patent No.: US 10,791,703 B2
(45) Date of Patent: Oct. 6, 2020

(54) WALL ELEMENT FOR AN ANIMAL CAGE

(71) Applicant: BRUEGGLI, Romanshorn (CH)

(72) Inventors: Marco Stoffel, Zurich (CH); Benjamin Bachmann, Zurich (CH); Arno Lenzi, Zurich (CH); Nico Spinelli, Zurich (CH); Remo Sommer, Zurich (CH)

(73) Assignee: BRUEGGLI, Romanshorn (CH)

(*) Notice: Subject to any disclaimer, the term of this patent is extended or adjusted under 35 U.S.C. 154(b) by 164 days.

(21) Appl. No.: 16/083,770

(22) PCT Filed: Feb. 24, 2017

(86) PCT No.: PCT/EP2017/000264
§ 371 (c)(1),
(2) Date: Sep. 10, 2018

(87) PCT Pub. No.: WO2017/153037
PCT Pub. Date: Sep. 14, 2017

(65) Prior Publication Data
US 2019/0075753 A1 Mar. 14, 2019

(30) Foreign Application Priority Data
Mar. 11, 2016 (DE) .......... 20 2016 001 627

(51) Int. Cl.
*A01K 1/02* (2006.01)

(52) U.S. Cl.
CPC .......... *A01K 1/0272* (2013.01); *A01K 1/0245* (2013.01)

(58) Field of Classification Search
CPC ...... A01K 1/02; A01K 1/0272; A01K 1/0236; A01K 1/0245; A01K 1/0281; A01K 1/029; A01K 1/03; A01K 1/032; A01K 1/033; A01K 1/034; A01K 31/07; A01K 1/0035; A01K 1/0088; A01K 31/08
See application file for complete search history.

(56) References Cited

U.S. PATENT DOCUMENTS

| 4,010,880 A | 3/1977 | Guillot-Munoz |
| D347,120 S | 5/1994 | Artz |
| 5,615,640 A * | 4/1997 | Luiz .......... A01K 1/03 119/482 |
| 6,318,294 B1 * | 11/2001 | Richmond ........ A01K 1/033 119/482 |
| 6,354,245 B1 | 3/2002 | Roddy et al. |
| 6,460,486 B1 | 10/2002 | Powers et al. |
| 6,763,784 B1 * | 7/2004 | Liu .......... A01K 31/06 119/452 |

(Continued)

FOREIGN PATENT DOCUMENTS

| DE | 40601346-0004 | 8/2006 |
| DE | 202006002167 U1 | 7/2007 |

(Continued)

OTHER PUBLICATIONS

DE 202009015507 Machine translation (Year: 2009).*

(Continued)

*Primary Examiner* — Son T Nguyen
(74) *Attorney, Agent, or Firm* — Caesar Rivise, PC

(57) ABSTRACT

The invention relates to a wall element (6) for an animal cage (1), particularly for a dog cage, particularly for housing an animal in the luggage compartment of a passenger-carrying motor vehicle. According to the invention, the wall element (6) comprises at least one elastically compressible cavity in order to increase the level of safety of said animal cage (1) in the event of a crash.

18 Claims, 9 Drawing Sheets

(56) References Cited

U.S. PATENT DOCUMENTS

| | | | |
|---|---|---|---|
| 7,938,085 B1* | 5/2011 | Tsengas | A01K 1/034 119/474 |
| 2005/0115512 A1* | 6/2005 | Fritsch | A01K 1/0088 119/454 |
| 2006/0260558 A1* | 11/2006 | Wu | A01K 1/033 119/498 |
| 2007/0084411 A1 | 4/2007 | Bennett | |
| 2008/0029043 A1* | 2/2008 | Lawrence | A01K 1/0245 119/501 |
| 2009/0126638 A1 | 5/2009 | Bennett | |
| 2009/0314219 A1 | 12/2009 | Bryson | |
| 2009/0320390 A1* | 12/2009 | Kolozsvari | A01K 1/033 52/202 |
| 2014/0102377 A1 | 4/2014 | Hoffman | |
| 2018/0035635 A1* | 2/2018 | Hutchinson | A01K 1/02 |
| 2018/0359989 A1* | 12/2018 | Hampel | A01K 1/01 |

FOREIGN PATENT DOCUMENTS

| | | |
|---|---|---|
| DE | 202009015507 U1 | 7/2010 |
| DE | 202014005168 U1 | 8/2014 |
| DE | 102014108110 A1 | 12/2014 |
| EP | 1661455 A1 | 5/2006 |

OTHER PUBLICATIONS

English language Register Information for Design No. 40601346-0004 (2006).
English language abstract for DE 102014108110 A1 (2014).
English language abstract for DE 202006002167 U1 (2007).
English language abstract for DE 20200915507 U1 (2010).
English language abstract for DE 202014005168 U1 (2014).
International Search Report from corresponding PCT/EP2017/000264 dated Apr. 25, 2017.

* cited by examiner

Section A-A

Section B-B

WALL ELEMENT FOR AN ANIMAL CAGE

CROSS-REFERENCE TO RELATED APPLICATIONS

This application is a U.S. National Phase Application of PCT/EP2017/000264, filed Feb. 24, 2017, which claims priority to DE 202016001627.0, filed Mar. 11, 2016, the contents of which applications are incorporated herein by reference in their entireties for all purposes.

BACKGROUND OF THE INVENTION

The invention concerns a wall element for an animal cage, in particular a dog cage for the accommodation of a dog in a luggage compartment of a motor vehicle. Furthermore, the invention concerns a corresponding animal cage.

State-of-the-art dog cages (e.g. DE 40 601 346) are known to be used to transport a dog or other pet in the trunk of a passenger car. A problem with these well-known animal cages is the risk of injury in an accident (crash).

The invention is therefore based on the task of improving crash safety in such an animal cage.

This task is solved by an inventive wall element for such an animal cage according to the invention.

BRIEF SUMMARY OF THE INVENTION

The invention provides that the wall element has at least one elastically compressible cavity to increase the crash safety of the animal cage. This crash-safe design of the wall element reduces the risk of injury to an animal located in the animal cage upon impact with the crash-safe wall element, as the cavities in the wall element are elastically compressed, thereby reducing the severity of the impact.

In a preferred embodiment of the invention, the crash-safe wall element is produced by blow molding, which also creates the elastically compressible cavity. However, the invention is not limited to blow molding with regard to the method of manufacturing the wall element. The wall element can also be produced in another way.

In the preferred embodiment of the invention, the wall element is curved inwards in order to form a greater mechanical resistance in the event of an impact of an animal in the animal cage, as is already known in itself from dams. However, the wall element does not have to be curved inwards as a whole. There is also the possibility that the wall element has only a convex inward curved inner side, while the outer side of the wall element is either substantially flat, concave curved or at least less convex curved than the inner side.

The wall element is preferably made of plastic, such as polyethylene (e.g. PE-HD: polyethylene-high density) or ABS (ABS: acrylonitrile-butadiene-styrene). However, with regard to the material of the wall element, the invention is not limited to plastic.

It should also be mentioned that the elastically compressible cavity in the crash-safe wall element preferably has a volume of at least 50 cm$^3$, 100 cm$^3$, 200 cm$^3$ or at least 500 cm$^3$. It is also possible that the wall element has several cavities which are separated from each other and each contains the volume described above.

In the preferred embodiment of the invention, the wall element has several ribs, each of which forms a cavity. The individual ribs are preferably equidistant to each other and run parallel to each other, preferably substantially upright.

In the preferred embodiment of the invention, the wall element has a total of five ribs. However, the number of ribs can alternatively be larger or smaller. Preferably, the number of ribs of the wall element is in the range of 2-10, 3-8 or 4-6.

Furthermore, it should be mentioned that the invention does not only claim protection for the aforementioned inventive wall element as an individual part. Rather, the invention also claims protection for a complete animal cage with such a wall element.

In a preferred embodiment of the invention, the animal cage has four extruded profiles at least on one cage wall, which preferably consist of aluminum and form a rectangle, the wall element serving to improve crash safety being rectangular and fitted between the four extruded profiles. The crash-safe wall element is thus held by the four surrounding extruded profiles.

For this purpose, the individual adjacent extruded profiles preferably have a longitudinal groove, while the crash-safe wall element with its side edges forms a tongue, which forms a tongue-and-groove connection with the longitudinal grooves in the extruded profiles.

It has already been mentioned above that the crash-safe wall element is surrounded and held by extruded profiles. A distinction must be made between the horizontal extruded profiles above and below the crash-safe wall element and the upright extruded profiles on the opposite sides of the crash-safe wall element. In the preferred embodiment of the invention, a metal insert is arranged at the end of one of these horizontal extruded profiles for connection to the adjacent upright extruded profile.

This metal insert preferably has three tines which protrude substantially parallel to each other inwards from the metal insert, i.e. in the direction of the crash-safe wall element. The middle tine of the metal insert then preferably protrudes axially into a cavity of the adjacent horizontal extruded profile. The two outer tines of the metal insert, on the other hand, preferably engage axially in the opposite longitudinal grooves of the horizontal extruded profile.

On the side opposite the tines, the metal insert is preferably connected to the adjacent upright extruded profile, for example by a tongue-and-groove connection.

In this case, the metal insert is preferably surrounded by a plastic sheath that prevents direct contact between the metal insert and the horizontal extruded profile. On the one hand, this prevents annoying rattling noise that could occur in direct contact between the metal insert on the one hand and the extruded aluminum profile on the other. On the other hand, this also prevents damage to the relatively soft extruded aluminum profiles due to the relatively hard metal insert.

In accordance with the state of the art, the animal cage according to the invention preferably has a cage door on one side. The wall element serving to improve crash safety is then preferably arranged opposite the cage door.

It should also be mentioned that the animal cage preferably meets the technical standards ECE R17, ECE R126 and/or DIN75410 for crash safety and/or load securing.

BRIEF DESCRIPTION OF THE DRAWINGS

Other advantageous modifications of the invention are indicated in the dependent claims or explained in more detail below together with the description of the preferred embodiment referring to the figures. It is shown:

DETAILED DESCRIPTION OF PREFERRED EMBODIMENTS

Figure 1:
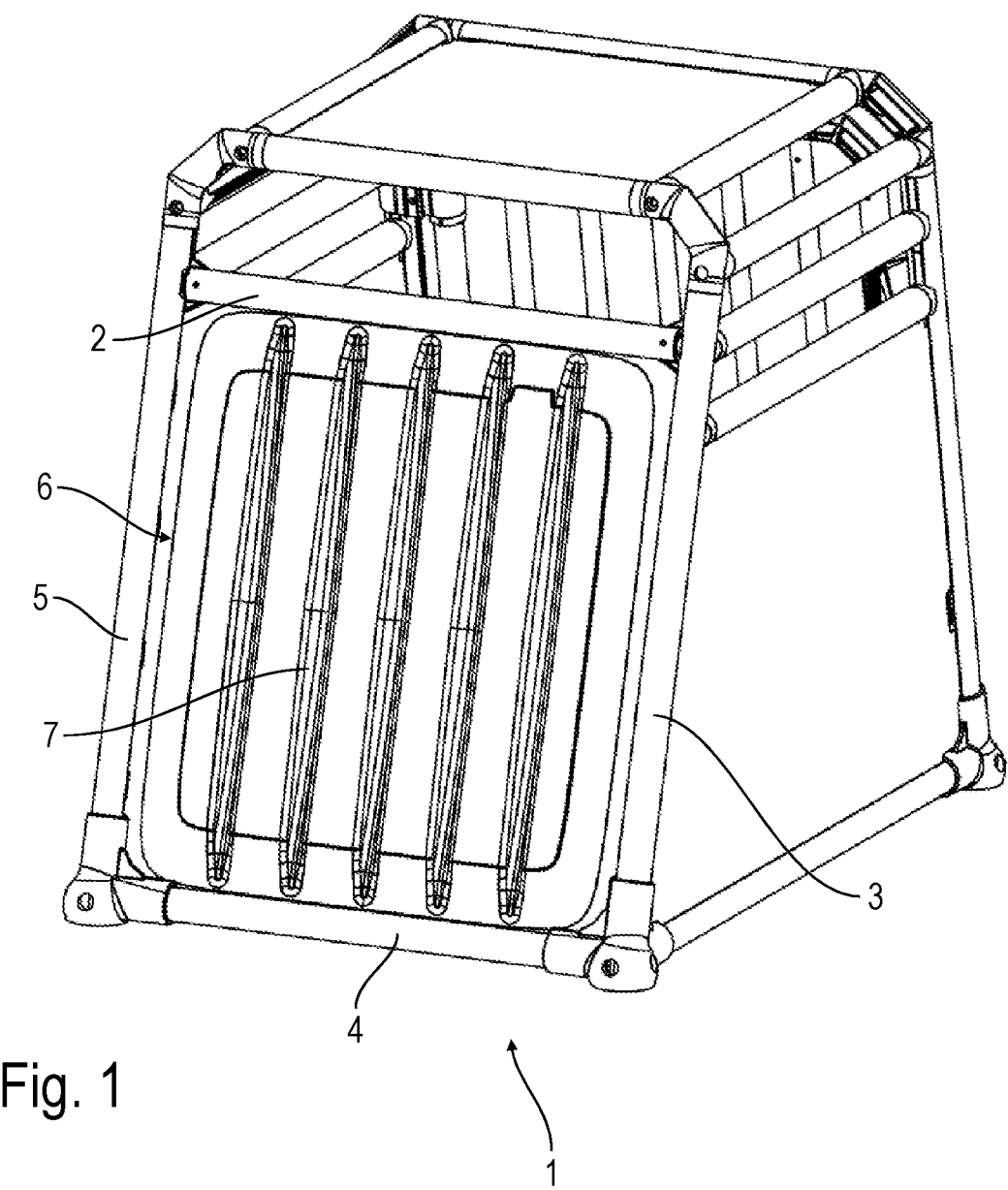
FIG. 1 a perspective view of an inventive dog cage with a crash-safe wall element.

The drawings show different views of an inventive animal cage 1, which is largely conventional, as is known from DE 40 601 346, for example.

The animal cage 1 essentially consists of several extruded aluminum profiles 2, 3, 4, 5, whereby the extruded profiles 3, 5 are arranged essentially upright and slightly inclined to the vertical, while the extruded profiles 2, 4 are arranged horizontally. The extruded profiles 2-5 form a rectangle, with a crash-safe wall element 6 fitted between the extruded profiles 2-5.

The crash-safe wall element 6 in this embodiment is made of polyethylene (PE-HD) and is produced by blow molding. It should be mentioned here that the crash-safe wall element 6 has five ribs 7, which run upright in the crash-safe wall element 6 and each enclose a cavity 8. The individual ribs 7 are therefore elastically deformable in the event of an impact due to the cavities 8 in them, which reduces the severity of an impact and thus the risk of injury.

It should be mentioned here that the individual ribs 7 each have a wall thickness d1 or d2 which is sufficiently low to enable the elastic deformability.

Figure 2:
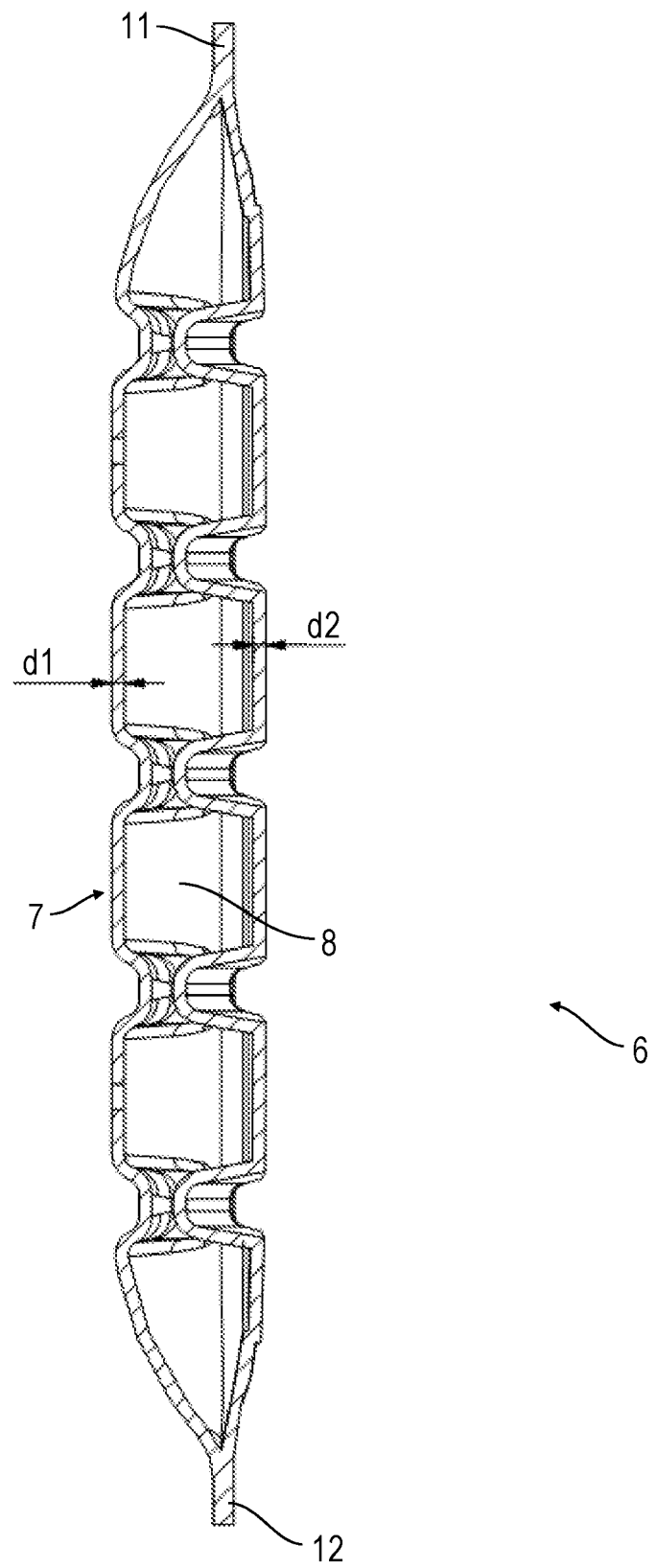
FIG. 2 shows a cross-sectional view of the crash-safe wall element.
Figure 3:
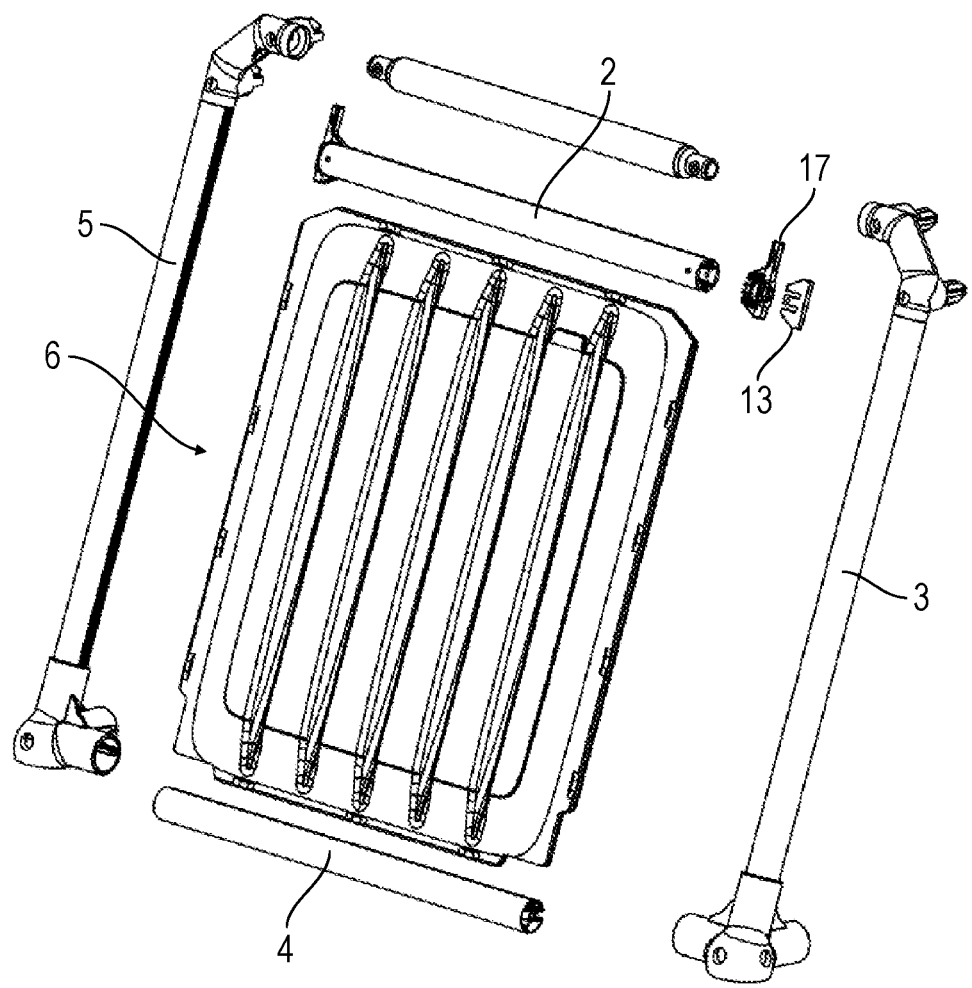
FIG. 3 shows an exploded view of the crash-safe wall element with the surrounding string profiles.

It should also be mentioned that the crash-safe wall element 6 has a slightly convex inner side, which is shown in FIG. 2 on the left. The outside of the crash-safe wall element 6, on the other hand, is essentially flat, as can be seen in FIG. 2 on the right-hand side. This inward curvature of the crash-safe wall element 6 increases the resistance to an impact from the inside, as is already known from dams.

Figure 9:
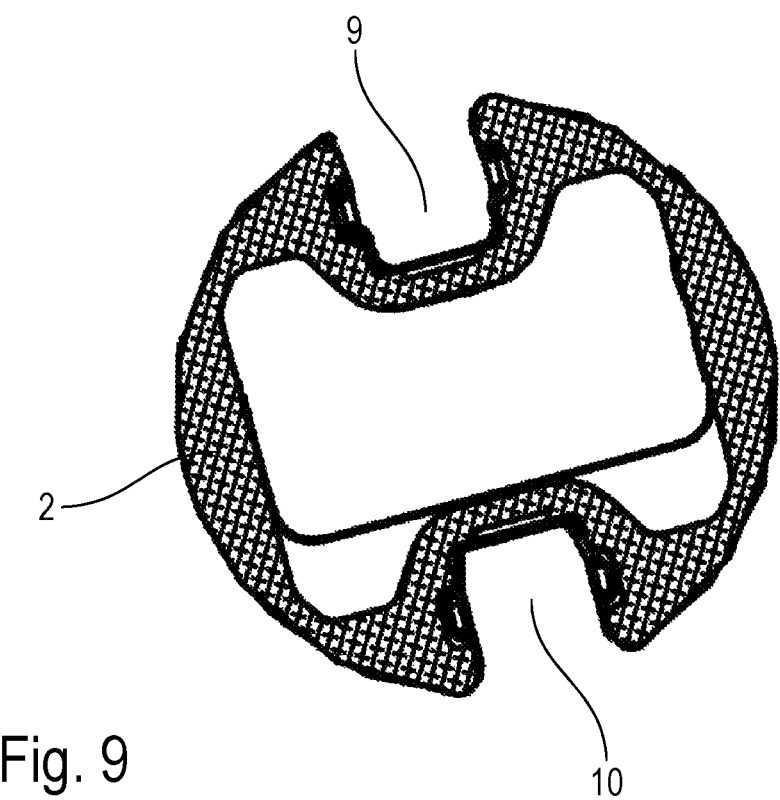
FIG. 9 shows a cross-sectional view of an extruded profile.

It has already been mentioned above that the crash-safe wall element 6 is fitted between the extruded profiles 2-5, whereby the wall element 6 is held by the surrounding extruded profiles 2-5. For this purpose, the extruded profiles 2-5 have longitudinal grooves 9, 10 (see FIG. 9). The crash-safe wall element 6 with its side edges 11, 12 then forms a tongue-and-groove-connection with the longitudinal grooves 9, 10 in the extruded profiles 2-5.

Furthermore, the invention provides for a special mechanical connection between the upright extruded profiles 3, 5 on one side and the horizontal extruded profile 2. Metal inserts 13 with three parallel tines 14, 15, 16 are provided for this purpose. The upper tine 14 of the metal insert 13 then protrudes axially into the upper longitudinal groove 9 of the extruded profile. The lower tine 16 of the metal insert 13, on the other hand, projects into the lower longitudinal groove 10 of the extruded profile 2. The middle tine 15 of the metal insert 13, on the other hand, protrudes in the axial direction into a cavity in the extruded profile 2.

The metal insert 13 is at least partially surrounded by a plastic sheath 17, which prevents direct contact between the metal insert 13 and the extruded profile 2. On the one hand, this prevents rattling noises between the aluminum of the extruded profile 2 and the metal of the metal insert 13. On the other hand, this also prevents the relatively hard metal of the metal insert 13 from scratching the relatively soft aluminum of the extruded profile 2.

Figure 4:
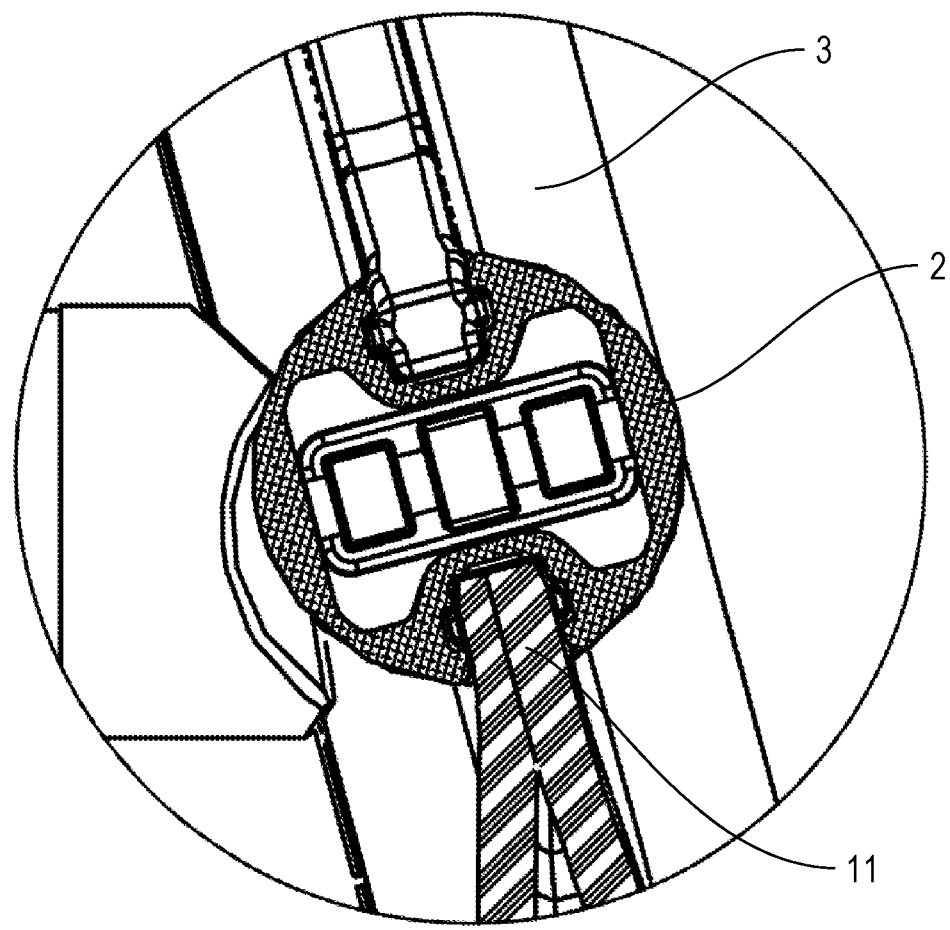
FIG. 4 shows a sectional view along the sectional line A-A in FIG. 6.
Figure 5:
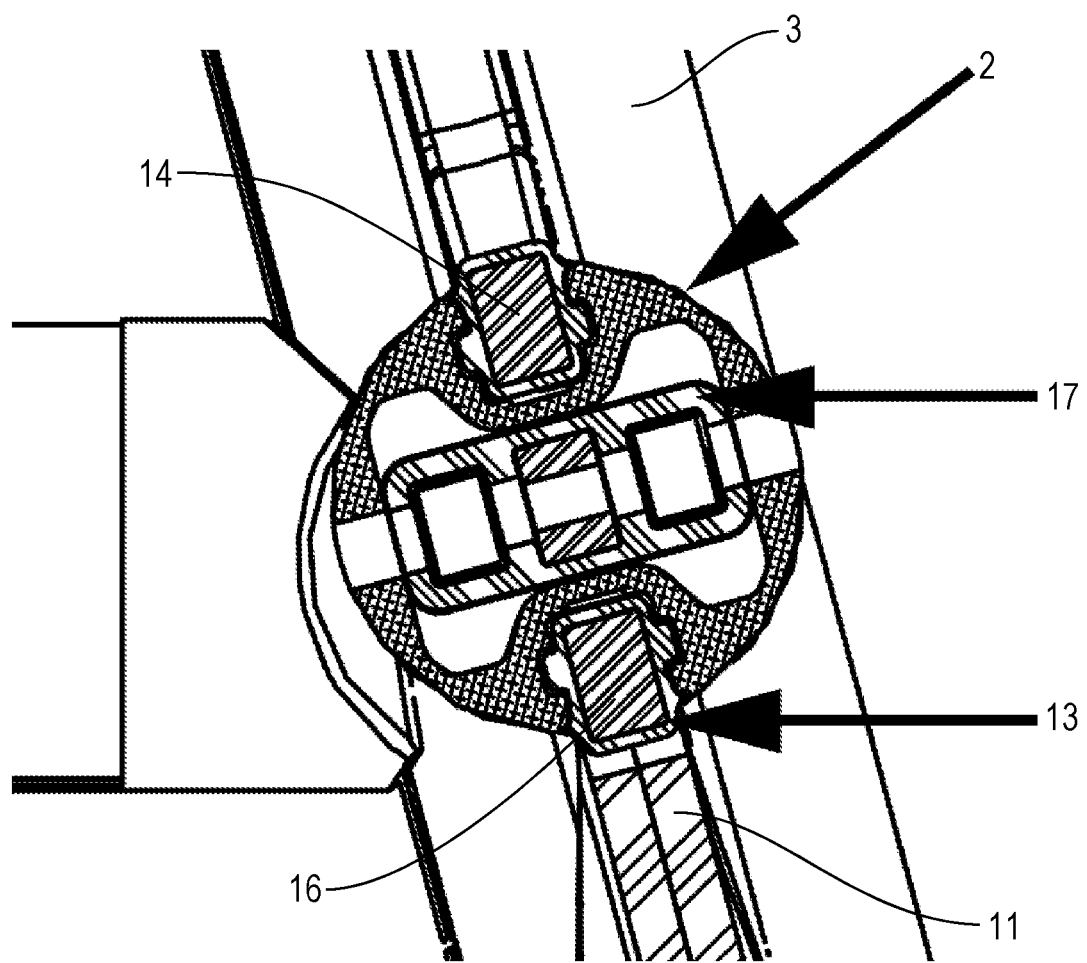
FIG. 5 shows a sectional view along the sectional line B-B in FIG. 6.
Figure 6:
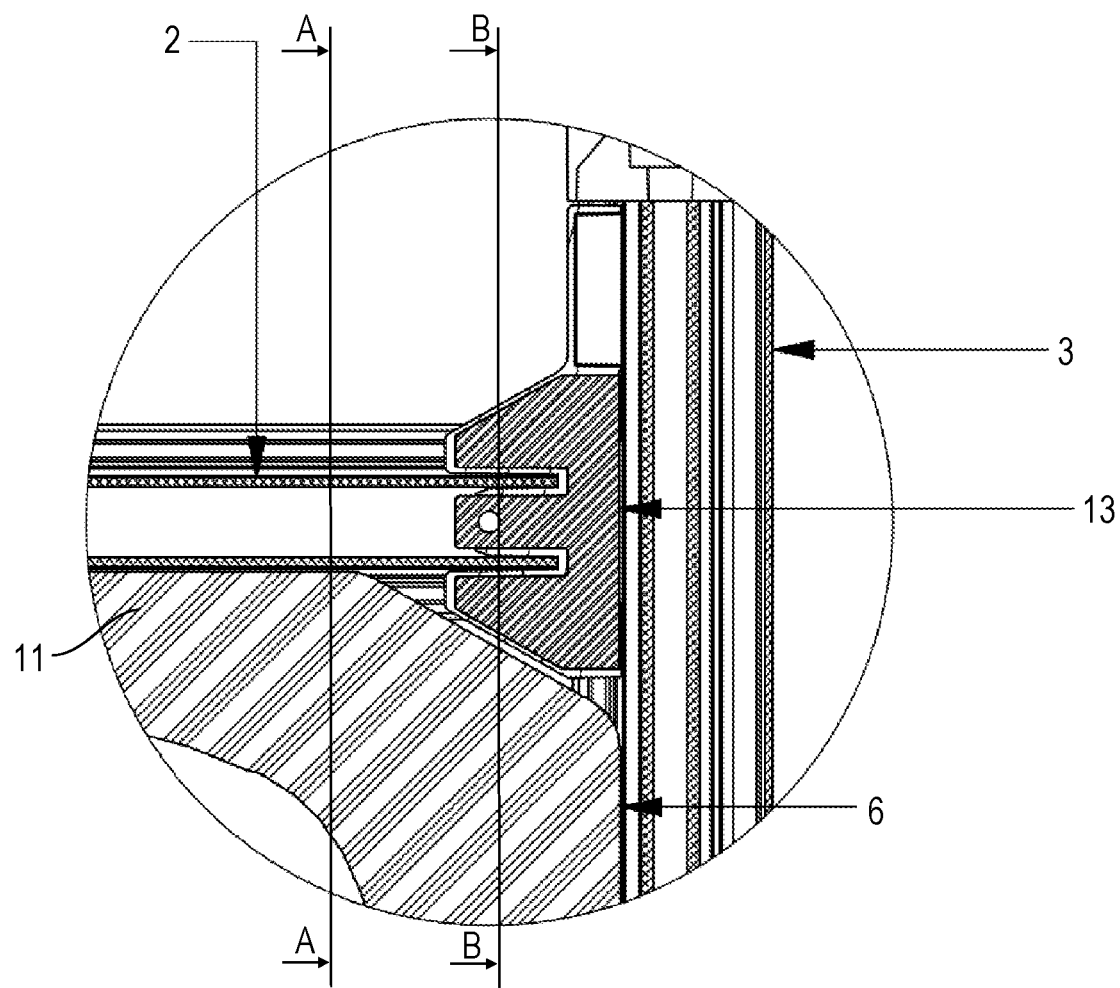
FIG. 6 shows a detailed view in the connection area of a horizontal extruded profile with an upright extruded profile.
Figure 7:
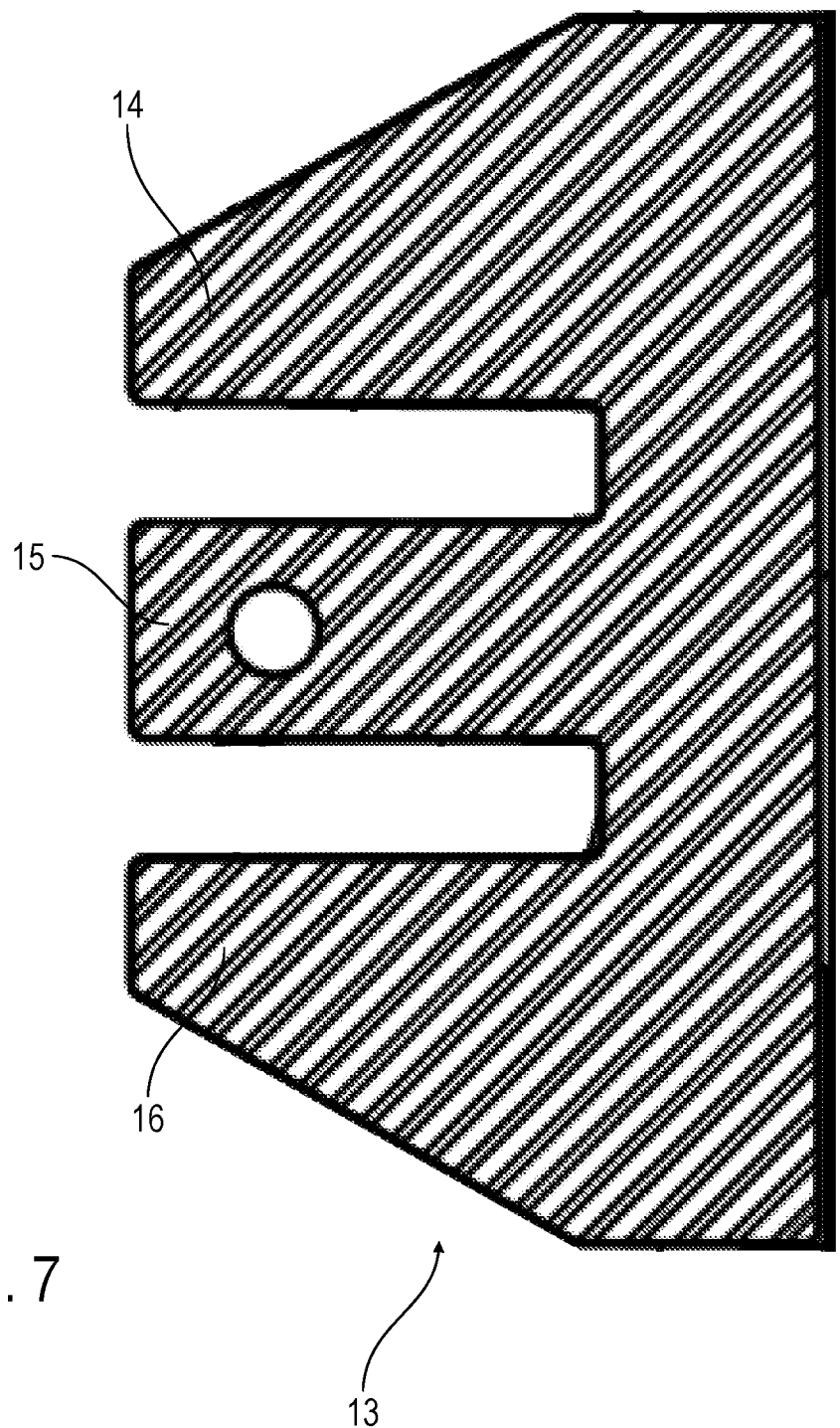
FIG. 7 shows a metal insert for connecting the upright extruded profiles to the horizontal extruded profiles.
Figure 8:
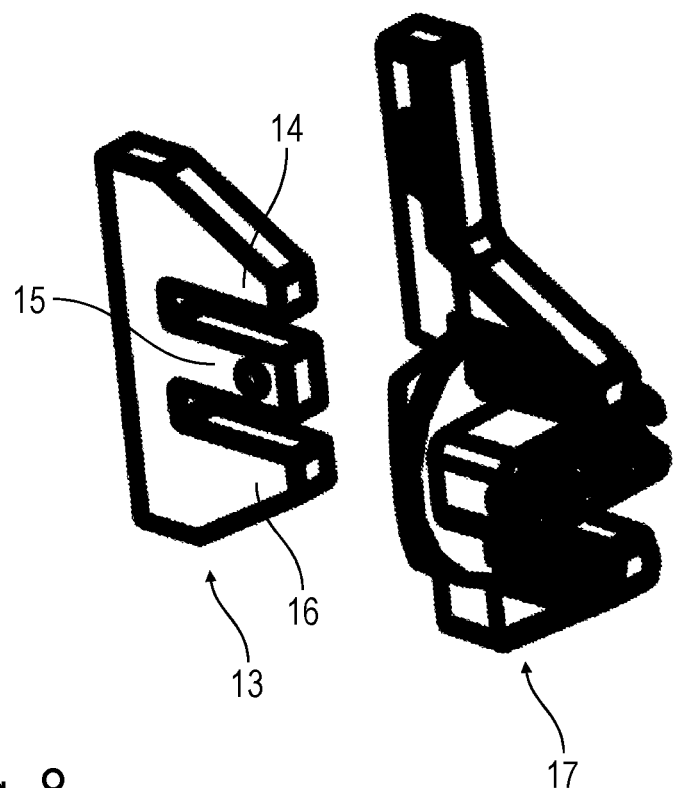
FIG. 8 is a perspective view of the metal insert from FIG. 7 with a plastic casing.
Figure 10:
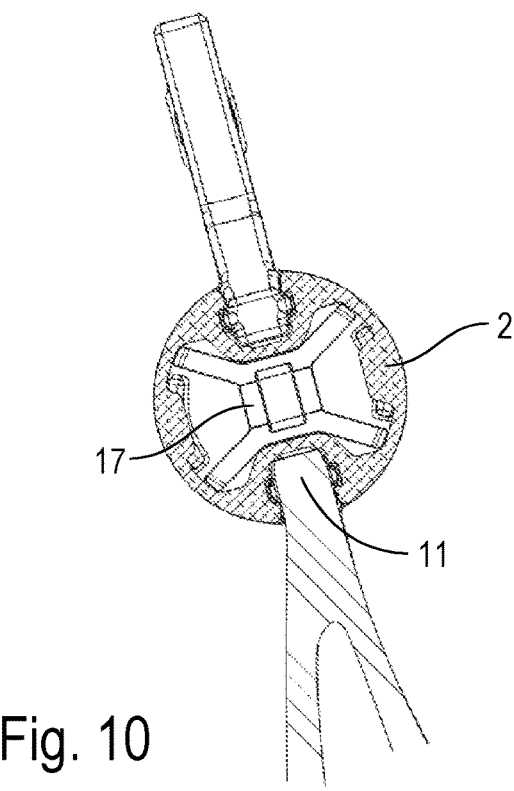
FIG. 10 is a modification of FIG. 4.
Figure 11:
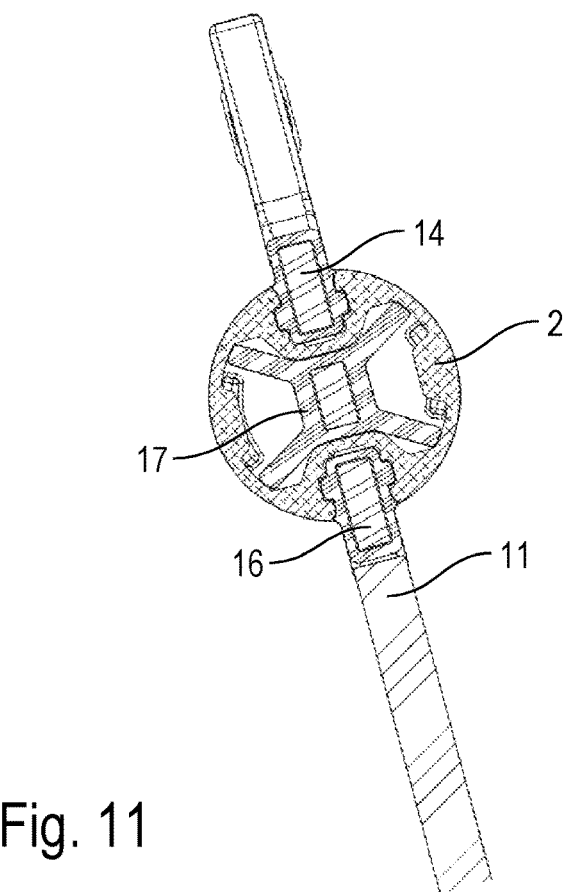
FIG. 11 is a modification of FIG. 5.

FIGS. 10 and 11 show a modification of FIGS. 4 and 5, respectively, so that to avoid repetition, reference is made to the above description using the same reference signs for corresponding details.

The invention is not limited to the preferred embodiment described above. Rather, a large number of variants and modifications are possible which also make use of the inventive idea and therefore fall within the scope of protection. In particular, the invention also claims protection for the object and the characteristics of the dependent claims irrespective of the claims referred to in each case and in particular also irrespective of the main claim. For example, the details of the invention concerning the connection of the extruded profiles are also of importance worthy of protection, irrespective of the question of crash safety.

LIST OF REFERENCE SIGNS

1 Animal cage
2-5 Extruded profiles
6 Wall element to improve crash safety
7 Ribs of the wall element
8 Cavity in the ribs
9, 10 Longitudinal grooves in the extruded profiles
11, 12 Side edges of the wall element
13 Metal insert
14-16 Tines of the metal insert
17 Plastic sheath around metal insert
d1, d2 Wall thickness of hollow ribs

The invention claimed is:

1. An animal cage comprising:
   four extruded profiles on a cage wall which form a rectangle and include a horizontal extruded profile and an upright extruded profile;
   a longitudinal groove on each of the tour extruded profiles;
   and
   a wall element for improving crash safety, which is rectangular, is fitted between the four extruded profiles and comprises side edges and at least one elastically compressible cavity configured to increase a crash safety of the animal cage,
   wherein:
   a) each of the side edges of the wall element forms a tongue of a tongue-and-groove connection with the longitudinal groove of a corresponding one of the four extruded profiles;
   b) a metal insert is arranged at an end of the horizontal extruded profile for connection to the upright extruded profile;
   c) the metal insert has three tines which project substantially parallel to one another from the metal insert;
   d) a central tine of the three tines engages axially in a cavity of the horizontal extruded profile;
   e) two outer tines of the three tines engage axially in two opposite longitudinal grooves of the horizontal extruded profile; and f) the metal insert is connected to the upright extruded profile adjacent thereto.

2. The animal cage according to claim 1, wherein the wall element is manufactured by blow molding.

3. The animal cage according to claim 1, wherein the wall element further comprise
   a) a convexly curved inner surface facing an interior of the animal cage when assembled; and
   b) an exterior surface facing away from the interior of the animal cage when assembled, the exterior surface being substantially flat or concave or at least less convex than the interior.

4. The animal cage according to claim 1, wherein the wall element comprises plastic.

5. The animal cage according to claim 4, wherein the plastic comprises a material selected from the group consisting of polyethylene and acrylonitrile-butadiene-styrene.

6. The animal cage according to claim 4, wherein the plastic comprises high-density polyethylene.

7. The animal cage according to claim 1, wherein the at least one elastically compressible cavity has a volume of at least 50 cm$^3$.

8. The animal cage according to claim 1, wherein the wall element has several ribs which each form the at least one elastically compressible cavity.

9. The animal cage according to claim 8, wherein the ribs run parallel to each other.

10. The animal cage according to claim 9, wherein the ribs are arranged substantially equidistantly.

11. The animal cage according to claim 10, wherein the ribs run upright in an assembled state.

12. The animal cage according to claim 11, wherein a number of ribs is greater than 3.

13. The animal cage according to claim 12, wherein the number of ribs is less than 10.

14. The animal cage according to claim 1, wherein the metal insert is at least partially surrounded by a plastic sheath which prevents direct contact between the metal insert and the horizontal extruded profile.

15. The animal cage according to claim 1, wherein
   a) the animal cage has a cage door on one side, and
   b) the wall element serving to improve crash safety is arranged opposite the cage door.

16. The animal cage according to claim 1, wherein the extruded profiles are made of aluminum or an aluminum alloy.

17. The animal cage in accordance with claim 1, wherein the animal cage complies with at least one of technical standards ECE R17, ECE R126 and DIN75410 for crash safety and load securing.

18. The animal cage according to claim 1, wherein the wall element serving to improve crash safety is curved inwards.

* * * * *